(12) United States Patent
Kim et al.

(10) Patent No.: US 12,197,815 B2
(45) Date of Patent: Jan. 14, 2025

(54) SYSTEM FOR SETTING VOICE RECOGNITION RCU BY USING CLOUD SERVER, AND METHOD THEREFOR

(71) Applicant: REMOTE SOLUTION CO., LTD., Gimcheon-si (KR)

(72) Inventors: Jae Won Kim, Pohang-si (KR); Kyoung Jin Bae, Gimcheon-si (KR)

(73) Assignee: REMOTE SOLUTION CO., LTD., Gimcheon-si (KR)

( * ) Notice: Subject to any disclaimer, the term of this patent is extended or adjusted under 35 U.S.C. 154(b) by 245 days.

(21) Appl. No.: 17/784,090

(22) PCT Filed: Jan. 3, 2020

(86) PCT No.: PCT/KR2020/000085
§ 371 (c)(1),
(2) Date: Jun. 9, 2022

(87) PCT Pub. No.: WO2021/117973
PCT Pub. Date: Jun. 17, 2021

(65) Prior Publication Data
US 2023/0018252 A1  Jan. 19, 2023

(30) Foreign Application Priority Data
Dec. 9, 2019 (KR) .................. 10-2019-0162493

(51) Int. Cl.
*G06F 3/16* (2006.01)
*G10L 15/08* (2006.01)
*G10L 15/30* (2013.01)

(52) U.S. Cl.
CPC ............ *G06F 3/167* (2013.01); *G10L 15/083* (2013.01); *G10L 15/30* (2013.01)

(58) Field of Classification Search
CPC ........ G06F 3/167; G10L 15/083; G10L 15/30
(Continued)

(56) References Cited

U.S. PATENT DOCUMENTS 10,560,737 B2 * 2/2020 Lawrence ........ H04N 21/42221
10,847,176 B2 * 11/2020 Kristjansson .......... H04N 5/602
(Continued)

FOREIGN PATENT DOCUMENTS

CN         109118747 A    1/2019
KR     2011-0061246 A    9/2011
(Continued)

OTHER PUBLICATIONS

Written Opinion of the International Searching Authority for PCT/KR2020/000085 (PCT/ISA/237).

*Primary Examiner* — Michael N Opsasnick
(74) *Attorney, Agent, or Firm* — You & IP, LLC (57) ABSTRACT

A system for setting a voice recognition remote control unit (RCU) by using a cloud server, and a method therefor are proposed. The system is configured to include a communication interface configured to perform remote wireless communication with a device to be controlled and receive a voice signal for registering device information of the device to be controlled, and an interface setting unit configured to set IR code information corresponding to the device to be controlled in the communication interface through comparison of result data obtained by recognizing the voice signal with IR code information which is registered in the cloud server as a DB for each of device information (EDID).

2 Claims, 5 Drawing Sheets (58) Field of Classification Search
USPC .......................................................... 704/236
See application file for complete search history.

(56) References Cited

U.S. PATENT DOCUMENTS

| | | | |
|---|---|---|---|
| 11,234,039 B2* | 1/2022 | Lawrence | ................ G06F 3/167 |
| 11,437,057 B2* | 9/2022 | Kristjansson | .......... H04N 17/04 |
| 2012/0249890 A1* | 10/2012 | Chardon | .......... H04N 21/43635 |
| | | | 348/734 |
| 2013/0132094 A1 | 5/2013 | Lim | |
| 2013/0290001 A1 | 10/2013 | Yun et al. | |
| 2014/0193157 A1 | 7/2014 | Du et al. | |
| 2017/0323646 A1 | 11/2017 | Kojima et al. | |
| 2018/0027204 A1 | 1/2018 | Kim et al. | |
| 2018/0122226 A1* | 5/2018 | Ahn | ...................... H04L 12/282 |
| 2018/0165951 A1 | 6/2018 | Kim et al. | |
| 2020/0351538 A1* | 11/2020 | Kim | ................... H04N 21/4182 |

FOREIGN PATENT DOCUMENTS

| | | |
|---|---|---|
| KR | 10-2017-0004497 A | 1/2017 |
| KR | 10-1739554 B1 | 5/2017 |
| KR | 10-1917182 B1 | 1/2019 |
| KR | 10-2013291 B1 | 11/2019 |

\* cited by examiner

SYSTEM FOR SETTING VOICE RECOGNITION RCU BY USING CLOUD SERVER, AND METHOD THEREFOR

TECHNICAL FIELD

The present disclosure relates to a system for setting a voice recognition remote control unit (RCU) by using a cloud server, and a method therefor.

BACKGROUND ART

A set-top box (STB) is a device that is connected to a TV, receives an external signal, converts the external signal appropriately, and displays content on a TV screen. Such a set-top box is provided as a set with a remote control, and a user operates and remotely controls the set-top box.

In general, the remote control of a set-top box is manufactured to control only the set-top box. In this case, another remote control for controlling a TV should be separately provided, which causes inconvenience in which the user should have two remote controls. For example, in order to change the channels of the set-top box, the user should operate the remote control of the set-top box, and in order to change volume of the TV, the user should operate the remote control of the TV. In order to solve such inconvenience, a remote control capable of simultaneously controlling the set-top box as well as a TV is widely used.

In the related art, Korean Application Publication No. 2011-0061246 discloses an embodiment that includes: an input unit provided with a plurality of buttons; a signal transmitter configured to transmit a remote control signal for controlling a TV or a set-top box; a storage configured to store a mapping table in which an input signal of the input unit corresponds to the remote control signal; and a controller configured to control the signal transmitter so that the signal transmitter transmits the remote control signal corresponding to the input signal by referring to the mapping table when the input signal of the input unit is applied, wherein each button includes an integrated power button capable of generating the input signal corresponding to the remote control signal for turning on or off the power of the TV and the set-top box together.

According to the related art, since Extended Display Identification Data (EDID) matching actual TV brand products may be different due to Original Equipment Manufacturer (OEM) production, the corresponding EDID is set on a remote control, so the corresponding brand products are not properly recognized, whereby there is a problem in that an error occurs in the operation of the remote control.

DISCLOSURE

Technical Problem

The present disclosure is to solve the above-described problems, and an objective of the present disclosure is to provide a system for setting a voice recognition RCU by using a cloud server, and a method therefor, the system and method being capable of responding to a request for setting a remote control through user voice recognition while easily setting the remote control by using the cloud server.

Technical Solution

An embodiment of the present disclosure includes: a communication interface configured to perform remote wireless communication with a device to be controlled and receive a voice signal for registering device information of the device to be controlled; and an interface setting unit configured to set IR code information corresponding to the device to be controlled in the communication interface through comparison of result data obtained by recognizing the voice signal with the IR code information which is registered in the cloud server as a DB for each of device information (EDID).

Preferably, the interface setting unit may include: a voice recognition module configured to receive the voice signal from the communication interface and recognize the device information of the device to be controlled; a comparison and determination module configured to perform the comparison of the result data obtained by recognizing the device information by the voice recognition module with the IR code information which is registered in the cloud server as the DB for each of device information (EDID); and a setting module configured to retrieve the Infrared (IR) code information corresponding to the device information through the voice recognition from the DB registered in the cloud server and set the IR code information in the communication interface when the device information through the voice recognition is the same as the device information registered as the DB in the cloud server as a result determined by the comparison and determination module.

Preferably, the interface setting unit may include: a voice recognition module configured to receive the voice signal from the communication interface and recognize the device information of the device to be controlled; a comparison and determination module configured to perform the comparison of the result data obtained by recognizing the device information by the voice recognition module with the IR code information which is registered in the cloud server as the DB for each of device information (EDID); a reception module configured to accept registration of unsupported device information by receiving the voice signal through the voice recognition module when the device information is unsupported as a result determined by the comparison and determination module; and a DB management module configured to request an additional upload of the IR code information for each of unsupported device information to the DB in the cloud server based on the voice signal received through the reception module.

Preferably, the interface setting unit may include a voice signal request module configured to request a voice signal for the device information to the communication interface in order to obtain unregistered device information when the device information (EDID) is not registered in the cloud server.

Meanwhile, a method using a system for setting a voice recognition RCU by using a cloud server includes: a) receiving a voice signal through a communication interface to recognize device information of a device to be controlled; and b) setting, by an interface setting unit, IR code information corresponding to the device to be controlled in the communication interface through comparison of result data obtained by recognizing the voice signal with the IR code information which is registered in the cloud server as a DB for each of device information (EDID).

Preferably, step of b) may include retrieving the Infrared (IR) code information corresponding to the device information through voice recognition from the DB registered in the cloud server and set the IR code information in the communication interface when the device information through the voice recognition is the same as the device information registered as the DB in the cloud server.

Preferably, step of b) may include: accepting registration of unsupported device information by receiving the voice signal through a voice recognition module when the device information through voice recognition is unsupported; and requesting an additional upload of the IR code information for each of unsupported device information to the DB in the cloud server based on the received voice signal.

Preferably, after step of b), the method may include requesting a voice signal for the device information to the communication interface in order to obtain unregistered device information when the device information (EDID) is not registered in the cloud server.

Advantageous Effects

According to the present disclosure, there is an effect where response to the request is possible for setting the remote control through the user voice recognition in a case of an unregistered product while the remote control is easily set by using the cloud server.

BEST MODE

Hereinafter, the present disclosure will be described in more detail with reference to the views. It should be noted that the same elements in the drawings are indicated by the same reference numerals wherever possible. In addition, descriptions of well-known functions and configurations that may unnecessarily obscure the gist of the present disclosure will be omitted.

Figure 1:
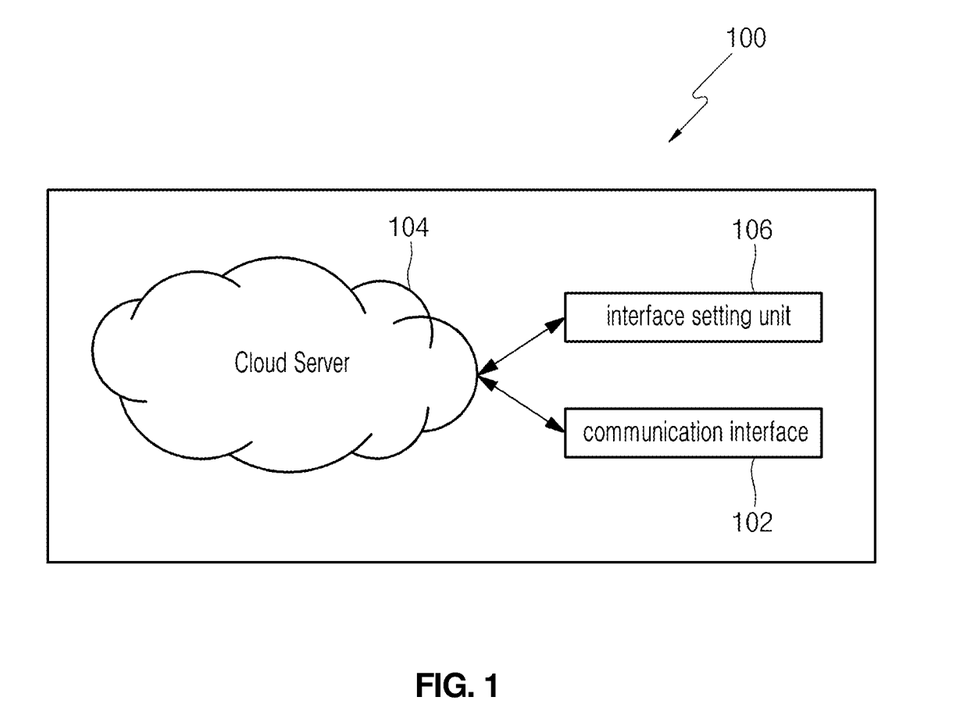
FIG. 1 is a configuration view illustrating a system for setting a voice recognition RCU by using a cloud server according to an exemplary embodiment of the present disclosure.

FIG. 1 is a configuration view illustrating a system for setting a voice recognition RCU by using a cloud server according to an exemplary embodiment of the present disclosure. As shown in FIG. 1, the system 100 for configuring the voice recognition RCU by using the cloud server includes a communication interface 102, a cloud server 104, and an interface setting unit 106.

The communication interface 102 is configured to perform remote wireless communication with a device to be controlled, and to receive a voice signal for registering device information of the device to be controlled from outside. Such a communication interface is, for example, a remote control unit (RCU).

The cloud server 104 is configured to register IR code information for each of device information (EDID) as a DB. The cloud server displays a graphical user interface (GUI) screen for user operation of a set-top box in real time through a TV terminal, and a user may operate the set-top box of the cloud server by operating the communication interface 102 while viewing the GUI screen of the TV terminal.

The interface setting unit 106 is configured to set IR code information corresponding to a device to be controlled in the communication interface through comparison of result data obtained by recognizing a voice signal with the IR code information. Such an interface setting unit 106 may be configured as a set-top box, or may be configured to perform functions of the set-top box in the cloud server. The interface setting unit 106 may be configured such that the functions of the set-top box are implemented in the cloud server, and the functions of the existing set-top box for the TV terminal are remotely performed by the cloud server. Accordingly, there is no need to provide a set-top box, and when a device to be controlled is a TV, only an Internet connection function is needed to be provided, and thus the convenience of maintenance/repair of the set-top box is increased.

Hereinafter, a detailed configuration will be described.

Figure 2:
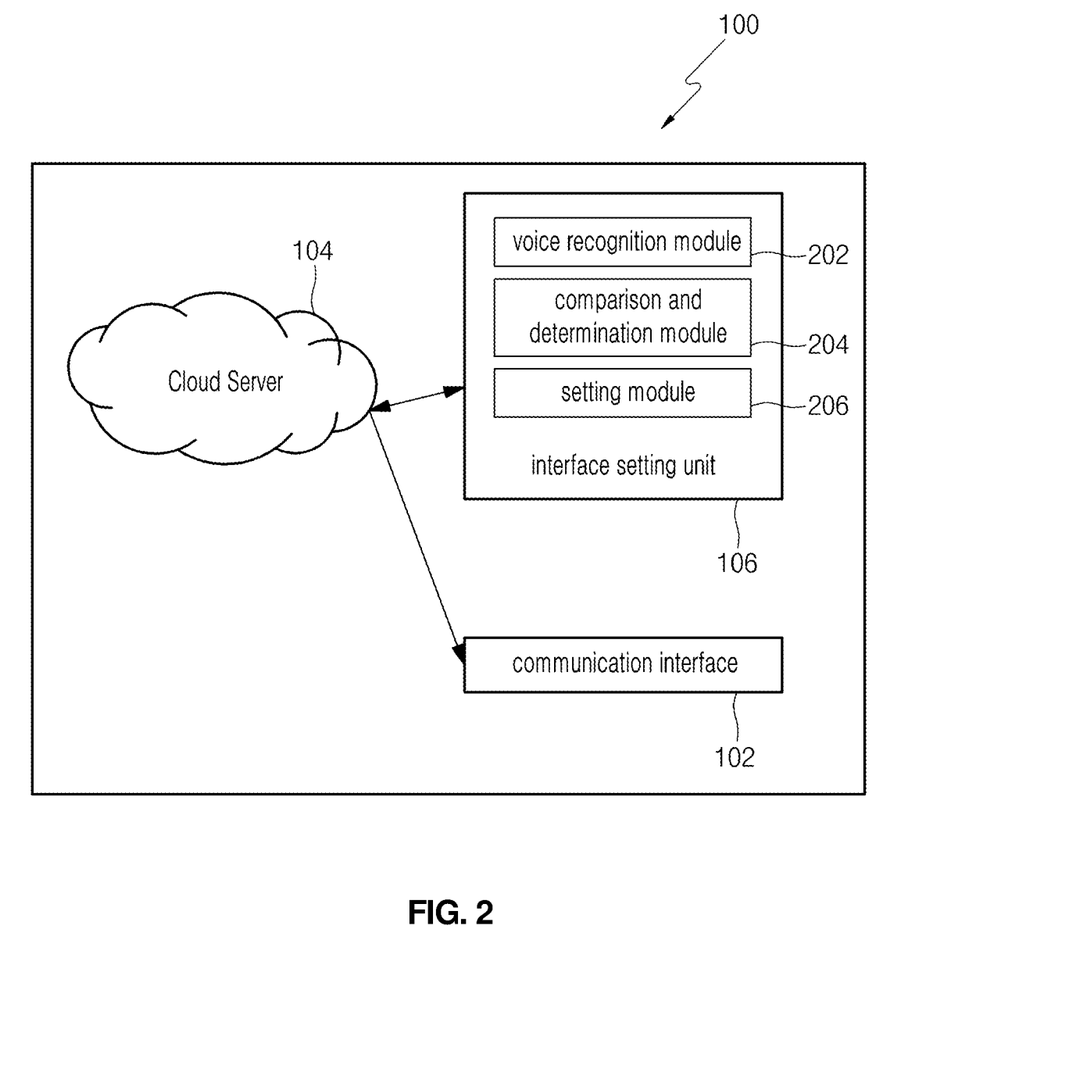
FIG. 2 is an exemplary view illustrating a detailed configuration of an interface setting unit according to the exemplary embodiment of the present disclosure.

FIG. 2 is an exemplary view illustrating a detailed configuration of an interface setting unit of the system for setting the voice recognition RCU by using the cloud server according to the exemplary embodiment of the present disclosure. In the system for setting the voice recognition RCU by using the cloud server in the present exemplary embodiment, the description of the communication interface 102 and the cloud server 104 except for the configuration of the interface setting unit will be omitted. As shown in FIG. 2, the interface setting unit 104 includes a voice recognition module 202, a comparison and determination module 204, and a setting module 206.

The voice recognition module 202 is configured to receive a voice signal from the communication interface and recognize device information of a device to be controlled. The comparison and determination module 204 is configured to perform, by the voice recognition module, a comparison of result data obtained by recognizing the device information with IR code information which is registered in the cloud server as a DB for each of device information (EDID).

The setting module 206 retrieves the Infrared (IR) code information corresponding to the device information obtained through the voice recognition from the DB registered in the cloud server and sets the IR code information in the communication interface in a case where the device information through the voice recognition is the same as the device information registered as the DB in the cloud server as a result determined by the comparison and determination module.

Figure 3:
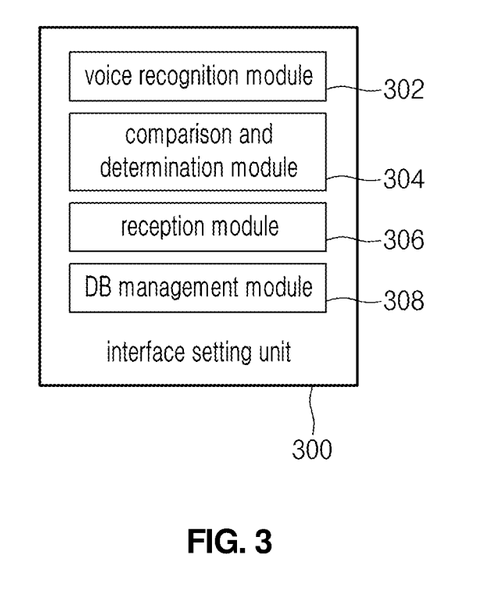
FIG. 3 is an exemplary view illustrating a detailed configuration of an interface setting unit according to another exemplary embodiment of the present disclosure.

FIG. 3 is an exemplary view illustrating a detailed configuration of an interface setting unit of the system for setting the voice recognition RCU by using the cloud server according to another exemplary embodiment of the present disclosure. As shown in FIG. 3, the interface setting unit 300 according to another exemplary embodiment of the present disclosure includes a voice recognition module 302, a comparison and determination module 304, a reception module 306, and a DB management module 308. In the system for setting the voice recognition RCU by using the cloud server in the present exemplary embodiment, the description of the communication interface 102 and the cloud server 104 except for the configuration of the interface setting unit will be omitted. Since the voice recognition module 302 and the comparison and determination module 304 respectively have the same configurations as the configurations of the voice recognition module 202 and the comparison and determination module 204 described above, a description thereof will be omitted.

When a result determined by the comparison and determination module 304 is unsupported device information, the reception module 306 accepts registration by receiving a voice signal through the voice recognition module 302 for the registration of the unsupported device information.

The DB management module 308 is configured to request an additional upload of IR code information for each of unsupported device information to the DB in the cloud server based on the voice signal received through the reception module 306. Accordingly, the IR code information for each of unsupported device information according to the voice signal is generated by a DB Manager and additionally uploaded to the DB in the cloud server.

Figure 4:
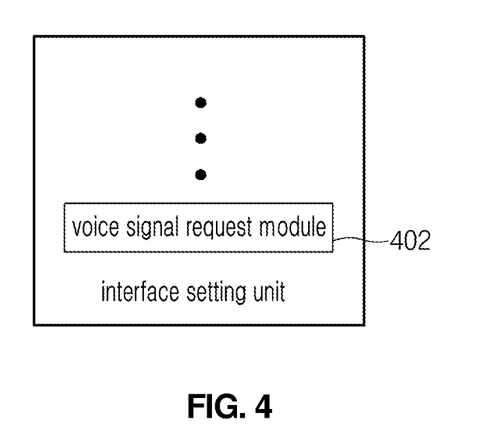
FIG. 4 is an exemplary view illustrating a detailed configuration of an interface setting unit according to yet another exemplary embodiment of the present disclosure.

FIG. 4 is an exemplary view illustrating a detailed configuration of an interface setting unit of the system for setting the voice recognition RCU by using the cloud server according to yet another exemplary embodiment of the present disclosure. In the system for setting the voice recognition RCU by using the cloud server in the present exemplary embodiment, the description of the communication interface 102 and the cloud server 104 except for the configuration of the interface setting unit will be omitted.

As shown in FIG. 4, the interface setting unit according to yet another exemplary embodiment of the present disclosure further includes a voice signal request module 402 in any one of the interface setting units of FIGS. 3 to 4.

Such a voice signal request module 402 is configured to request a voice signal for device information to the communication interface in order to obtain unregistered device information when the device information (EDID) is not registered in the cloud server.

Figure 5:
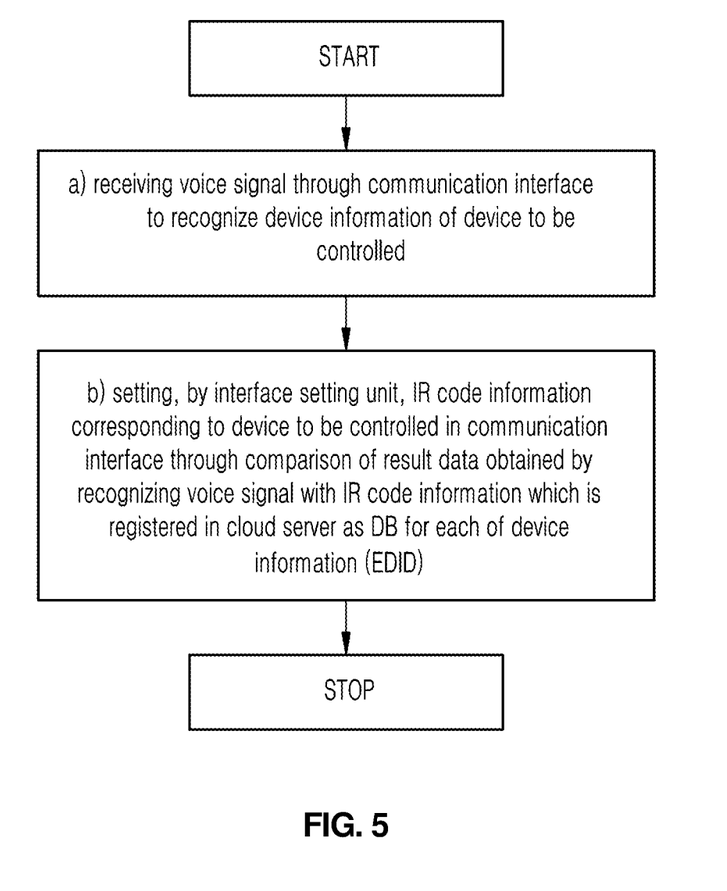
FIG. 5 is a flowchart of a method for configuring a voice recognition RCU by using a cloud server according to the exemplary embodiment of the present disclosure.

Meanwhile, a method using the system for setting the voice recognition RCU by using the cloud server will be described with reference to FIG. 5 as follows. FIG. 5 is a flowchart of a method for configuring a voice recognition RCU by using a cloud server according to the exemplary embodiment of the present disclosure.

As shown in FIG. 5, the method for configuring the voice recognition RCU by using the cloud server includes: a) receiving a voice signal through a communication interface and recognizing device information of a device to be controlled; and b) setting, by an interface setting unit, IR code information corresponding to the device to be controlled in the communication interface through comparison of result data obtained by recognizing the voice signal with IR code information which is registered in the cloud server as a DB for each of device information (EDID).

Here, step of b) includes retrieving Infrared (IR) code information corresponding to device information obtained through voice recognition from the DB registered in the cloud server and setting the IR code information in the communication interface when the device information through the voice recognition is the same as the device information registered as the DB in the cloud server.

In addition, step of b) includes: accepting registration by receiving a voice signal through a voice recognition module in order to register unsupported device information when the device information through the voice recognition is the unsupported device information; and requesting an additional upload of IR code information for each of unsupported device information to the DB in the cloud server based on the received voice signal.

In addition, after step of b), the method includes requesting a voice signal for device information to the communication interface to obtain unregistered device information when the device information (EDID) is not registered in the cloud server.

Figure 6:
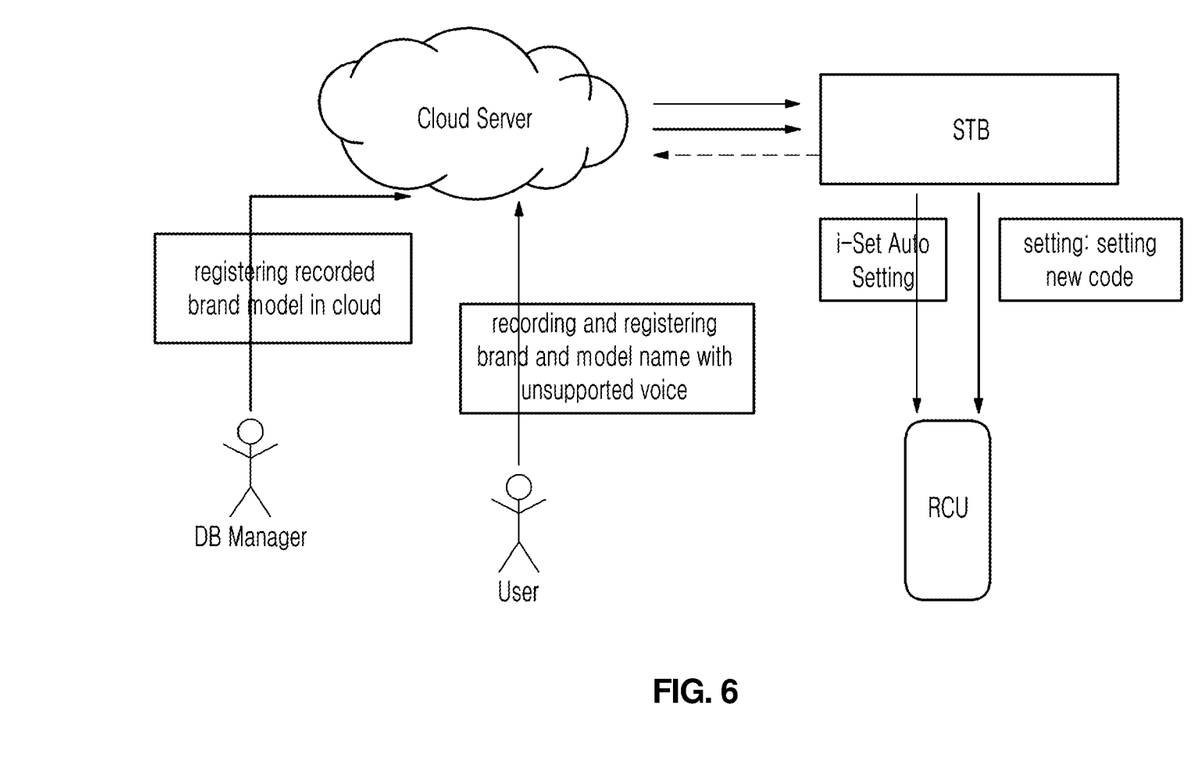
FIG. 6 is an exemplary view illustrating the system for setting the voice recognition RCU by using the cloud server, and the method therefor according to the exemplary embodiment of the present disclosure.

FIG. 6 is an exemplary view illustrating the system for setting the voice recognition RCU by using the cloud server, and the method therefor according to the exemplary embodiment of the present disclosure. In the configuration of the cloud server, the set-top box (STB), and the remote control unit (RCU), as shown in FIG. 6, due to not recognizing a brand and model name in a process of setting the set-top box and remote control, when a user accesses the cloud server via Wi-Fi through the RCU and registers recording of the brand and model name with an unsupported voice signal, a DB Manager registers IR code information for each device information (EDID) for the recorded brand model in the cloud, thereby setting a new code on the corresponding remote control.

The present disclosure relates to the system for setting the voice recognition RCU by using the cloud server, and the method therefor, and may be able to set IR code information corresponding to the brand or model name in the DB registered in the cloud server through the voice recognition of the RCU, thereby providing the effects in which the request for setting the remote control may be responded through the user's voice recognition in a case of an unregistered product while easily setting the remote control by using the cloud server.

In addition, in the system for setting the voice recognition RCU by using the cloud server according to the exemplary embodiment of the present disclosure, the communication interface and the interface setting unit may be configured as one remote control unit (RCU), or may be respectively configured as a set-top box (STB) and a remote control unit (RCU). That is, the system for setting the voice recognition RCU by using the cloud server is connected to the cloud server via a network using such as WiFi through the communication interface, so that Infrared (IR) code information of a home appliance product such as a TV, which is a control target, is requested through a voice signal, whereby the corresponding Infrared (IR) code information may be downloaded to be set in the communication interface when the Infrared (IR) code information is the same as that of the product registered in the cloud server. In this case, the setting method is set as an over-the-air programming (OTA) method. Here, the OTA method is a method for wirelessly distributing new software, firmware, settings, and encryption key updates to devices such as mobile phones, set-top boxes, and remote controls. For example, a set-top box and a remote control may be sold as one set so that the set-top box is controlled with the remote control. However, in a case where a user purchases a new TV that is a control target not set in the remote control unit (RCU), when a result recognized by the voice signal is received as device information to the cloud server connected to the network such as WiFi in order to set the corresponding Infrared (IR) code information in the communication interface, a request is placed for uploading additional IR code information for each of unsupported device information to the DB in the cloud server, whereby the additional uploading is requested so as to set the IR code information through the DB Manager (management).

As mentioned above according to the exemplary embodiment of the present disclosure, the communication interface and the interface setting unit may be configured as one remote control unit (RCU), and when information of a home appliance as a control target controllable with setting of Infrared (IR) code information by the cloud server and remote control unit (RCU) connected to the network using such as WiFi is not registered in the remote control unit (RCU) and the cloud server, the Infrared (IR) code information is requested to be uploaded to the cloud server by using the voice signal input through the communication interface of the remote control unit (RCU), whereby the Infrared (IR) code information processed in order to control the corresponding information of the home appliance is set to be controllable. That is, there is an effect where the response to the request is possible for setting the remote control through the user voice recognition in the case of the unregistered product while the remote control is easily set by using the cloud server.

The present disclosure is not limited by the exemplary embodiments of the present disclosure and the accompanying views in the above description, and it may be clearly understood by those skilled in the art that various substitutions, modifications, and changes may be executable without departing from the technical idea of the present disclosure.

DESCRIPTION OF THE REFERENCE NUMERALS IN THE DRAWINGS

102: communication interface
104: cloud server
106: interface setting unit
202, 302: voice recognition module
204, 304: comparison and determination module
206: setting module
306: reception module
308: DB management module
402: voice signal request module

The invention claimed is:

1. A system for setting a voice recognition remote control unit (RCU) by using a cloud server, the system comprising:
a cloud server including a database (DB) storing extended display identification data (EDID) and Infrared (IR) code information of a plurality of devices;
a communication interface configured to perform remote wireless communication with a target device to be controlled and receive a voice signal for registering device information of the target device; and
an interface setting unit configured to set the Infrared (IR) code information corresponding to the target device in the communication interface by communicating with the cloud server, the interface setting unit comprising:
a voice recognition module configured to receive the voice signal from the communication interface and recognize the device information of the target device from the voice signal;
a comparison and determination module configured to compare the device information recognized from the voice signal with each of the EDID stored in the DB of the cloud server, and determine whether the DB of the cloud server includes a target EDID corresponding to the device information;
a setting module configured to retrieve a target IR code information corresponding to the target EDID from the DB of the cloud server, and set the target IR code information in the communication interface;
a voice signal request module configured to request, when the DB of the cloud server does not include the target EDID corresponding to the device information, the voice signal for a to-be-registered device to the communication interface in order to obtain a to-be-registered device information; and
a reception module configured to recognize the to-be-registered device information by receiving the voice signal through the voice recognition module when the DB of the cloud server does not include the target EDID corresponding to the to-be-registered device information; and
a DB management module configured to request the cloud server for uploading the EDID and the IR code information for the to-be-registered device to the DB based on the to-be-registered device information,
wherein the DB management module is further configured to register the IR code information and the EDID for new brands and models in the DB of the cloud server when a user registers in the DB the new brands and models through the voice signal request module.

2. A method for setting a voice recognition remote control unit (RCU) by using a cloud server, the method comprising:
storing extended display identification data (EDID) and Infrared (IR) code information of a plurality of devices in a database (DB) of a cloud server;
receiving a voice signal through a communication interface to recognize device information of a target device to be controlled;
recognizing, by a comparison and determination module, the device information of the target device from the voice signal;
comparing, by a comparison and determination module, the device information recognized from the voice signal with each of the EDID stored in the DB of the cloud server; and
determining whether the DB of the cloud server includes a target EDID corresponding to the device information,
wherein when the DB of the cloud server includes the target EDID corresponding to the device information,
retrieving, by a setting module, an target IR code information corresponding to the target EDID from the DB of the cloud server; and
setting, by the setting module, the target Infrared (IR) code information in the communication interface, and wherein when the DB of the cloud server does not include the target EDID corresponding to the device information,
requesting, by a voice signal request module, the voice signal for a to-be-registered device to the communication interface in order to obtain a to-be-registered device information;
recognizing, by a reception module, the to-be-registered device information by receiving the voice signal through the voice recognition module;
requesting, by a DB management module, the cloud server for uploading the EDID and the IR code information for the to-be-registered device to the DB based on the to-be-registered device information; and
registering, by the server, the EDID and the IR code information for the to-be-registered device in the DB for the to-be-registered device information,
wherein the DB management module is further configured to register the IR code information and the EDID for new brands and models in the DB of the cloud server when a user registers in the DB the new brands and models through the voice signal request module.

* * * * *